United States Patent [19]
McMoore, Jr. et al.

[11] Patent Number: 4,889,295
[45] Date of Patent: Dec. 26, 1989

[54] OPTICAL FIBER SLEEVING GUIDE

[75] Inventors: Clarence J. McMoore, Jr., Huntsville; Melba T. Graham, Brownsboro, both of Ala.

[73] Assignee: Hughes Aircraft Company, Los Angeles, Calif.

[21] Appl. No.: 286,417

[22] Filed: Dec. 19, 1988

[51] Int. Cl.⁴ .................. B65H 75/10; B65H 75/28; B65H 55/04
[52] U.S. Cl. ............................ 242/118.3; 242/1; 242/47; 242/125.1; 242/159
[58] Field of Search .............. 242/47, 53, 18 R, 25 R, 242/1, 159, 164, 125.1, 125, 118.3, 118.31, 118.32, 118; 57/279

[56] References Cited

U.S. PATENT DOCUMENTS 4,529,148  7/1985  Hesprich et al. .................. 242/159
4,607,746  8/1986  Stinnette .......................... 242/159 X

FOREIGN PATENT DOCUMENTS 136256  6/1979  Fed. Rep. of Germany ... 242/125.1

Primary Examiner—Stanley N. Gilreath
Attorney, Agent, or Firm—Michael W. Sales

[57] ABSTRACT

The invention is an improved sleeve that includes a wire inserted through the length of the sleeve before the sleeve is mounted on a bobbin. The wire keeps the sleeve relatively kink free and removes any debris which may have been in the sleeve. The wire is removed from the sleeve and allows an optical fiber to be easily inserted into the sleeve to start winding of the optical fiber onto the bobbin.

3 Claims, 2 Drawing Sheets

OPTICAL FIBER SLEEVING GUIDE

OPTICAL FIBER SLEEVING GUIDE

This invention relates to fiber optic winding techniques. More particularly, the invention is an improved sleeve that includes a wire inserted through the length of the sleeve before the sleeve is mounted on a bobbin. The wire keeps the sleeve relatively kink free and removes any debris which may have been in the sleeve so that an optical fiber may be easily inserted into the sleeve to start winding.

BACKGROUND OF THE INVENTION

Optical fibers continue to play an increasingly important role in many commercial and military applications. In many instances, it is highly desirable to wind extremely long lengths of optical fiber onto bobbins for high density winding applications. Optical fibers are known to be delicate, however, and cuts, nicks, bruises, or other disruptions to the fiber can lead to catastrophic failure during fast payout and can lead to significant degradation of the optical transmissivity of the fiber.

Many current techniques for winding optical fiber onto bobbins have included manual steps and have had to consider the extremely sensitive nature of the optical fiber.

Such techniques have employed a teflon sleeve, for example, which is mounted on the bobbin during prewinding and which later receives the optical fiber. The optical fiber is inserted through the sleeve by hand, and the bobbin is then ready for final winding.

Unfortunately, many problems attend the use of the sleeve. In many cases, the sleeve will be crimped or bent during mounting on the bobbin. Such discontinuities make later insertion of the optical fiber through the sleeve extremely difficult, often requiring many hours of extra effort in some cases. In other cases, the sleeve is discovered to have been received from the vendor with debris inside. In such cases, the debris may not be detected until after the sleeve has been mounted on the bobbin, a base fiber layer wound onto the bobbin, and an unsuccessful attempt made to insert the optical fiber through the sleeve. Such impediments to inserting the optical fiber are extremely costly, and require possible discarding of the entire bobbin or installation of a new sleeve on the original bobbin. Since the sleeve is sometimes mounted to the bobbin by a slow curing process using an adhesive, finding the sleeve unsuitable after mounting is extremely undesirable and costly.

SUMMARY OF THE INVENTION

In one aspect, the invention is an improved method and sleeve for winding optical fiber. The improved sleeve comprises a sleeve for mounting on a bobbin. A flexible and rigid filament is inserted through the sleeve before mounting the sleeve on the bobbin and is removed from the sleeve after the sleeve is mounted on the bobbin but before optical fiber is inserted into the sleeve. The filament removes debris from the sleeve and keeps the sleeve "kink free" relative to the optical fiber. The filament may be scrap wire and preferably will have a diameter greater than the diameter of the optical fiber.

DETAILED DESCRIPTION

Figure 1:
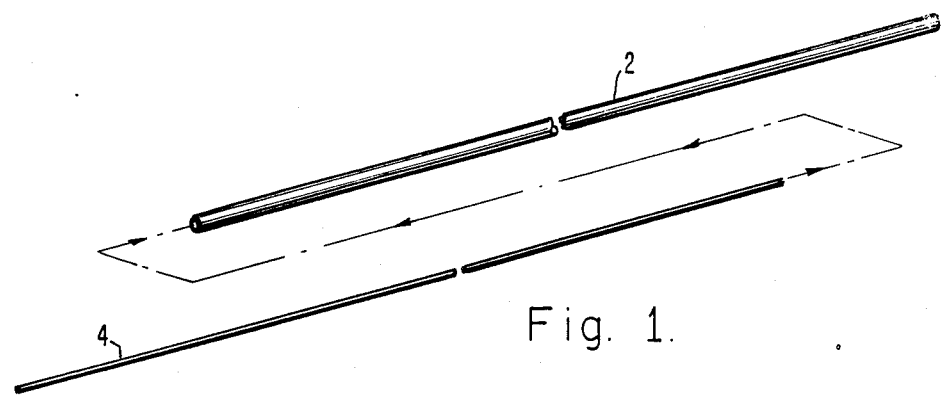
FIG. 1 is an illustration of a sleeve and wire.

Refer now to FIG. 1 which shows a conventional teflon sleeve 2 prior to mounting on a bobbin (not shown). Sleeve 2 is hollow and tubular and according to the invention, an improved sleeve may be made by inserting a wire 4 through the length of the sleeve 2. In a preferred embodiment, sleeve 2 is 60 inches in length and is made of teflon. Wire 4 is 62 inches in length and thus overhangs sleeve 2 by one inch at each end. Sleeve 2 has an inside diameter of approximately 0.350 mm and wire 4 has a diameter of 0.3318 mm in one embodiment. It has been found that wire 4, when inserted into sleeve 2 prior to mounting sleeve 2 onto and inside the bobbin, prevents crimping and bending of sleeve 2 and assures that sleeve 2 is free of blockage.

Figure 2:
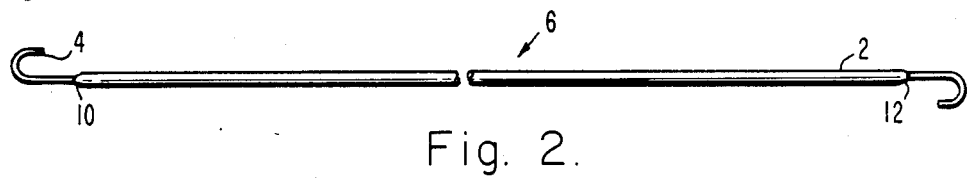
FIG. 2 is an illustration of an improved sleeve according to the invention.

Refer now to FIG. 2 which shows wire 4 inserted into sleeve 2 to form an improved sleeve 6. As shown in FIG. 2, wire 4 extends approximately 1 inch beyond each end 10 and 12 of sleeve 2. The excess portions of wire 4 are bent into hooks to secure wire 4 in place in sleeve 2. Improved sleeve 6 is now ready for mounting on a bobbin prior to winding optical fiber onto the bobbin.

Figure 3:
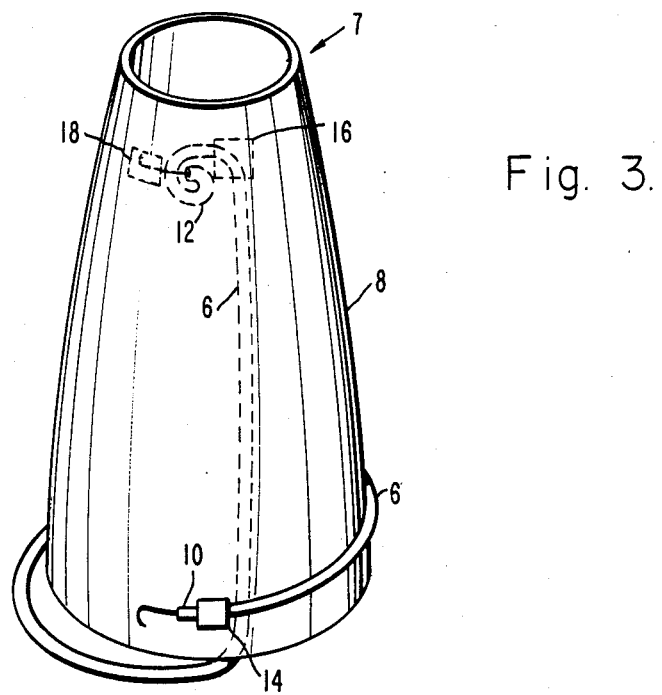
FIGS. 3 through 5 are illustrations of a bobbin during various steps according to the invention.
Figure 4:
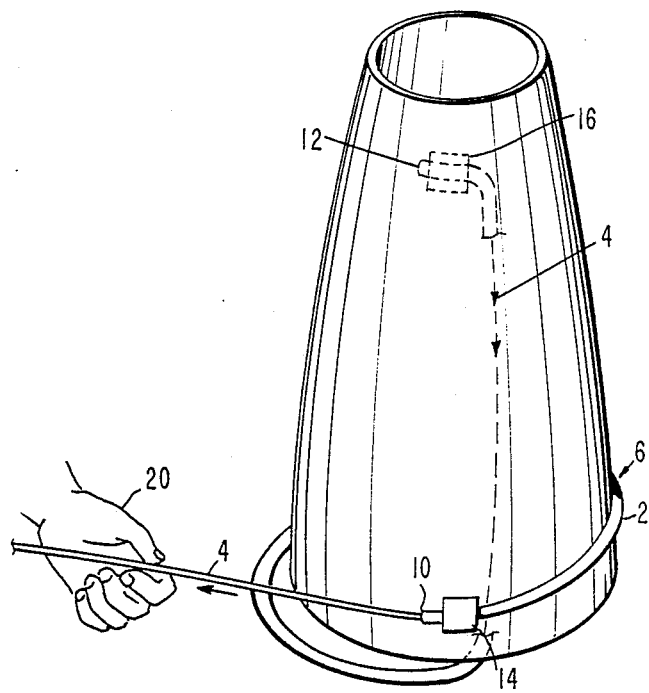
Figure 5:
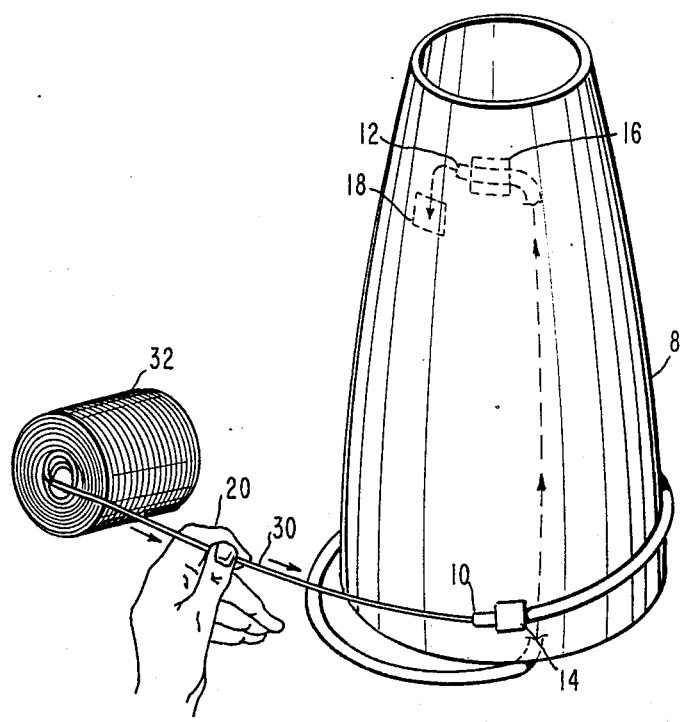

Refer now to FIGS. 3 through 5 which shows an improved sleeve 6 during various stages of mounting on and inside a bobbin 8. As shown in FIG. 3, one end 10 of sleeve 6 is secured by tape 14 on the exterior of bobbin 8 after being carefully positioned thereon. Sleeve 6 is then wrapped one full turn around bobbin 8, crosses over into the interior of bobbin 8, and then transits the interior of bobbin 8 (as shown by the hidden lines) from one end of bobbin 8 to an opposing end of bobbin 8 according to conventional techniques for routing sleeves on bobbins. The free end 12 of sleeve 6 is secured to the inside of bobbin 8 by tape 16. The excess hook portion of wire 4 at end 12 is also taped down by tape 18. Sleeve 6 is secured onto and inside bobbin 8 over its length by an RTV (Dow Corning 3145 Adhesive & Sealant) adhesive. The total time for routing a sleeve and curing the adhesive according to conventional techniques can be as much as six (6) hours. After the sleeve is properly secured, a baselayer wire may be wound onto bobbin 8. Thereafter, an optical fiber must be inserted through sleeve 6, secured at end 12, and then may be wound as desired over the baselayer wire onto bobbin 8 to form a final wound fiber optic cannister or like item.

Refer now to FIG. 4 which shows wire 4 being removed by a technician 20 prior to insertion of an optical fiber into sleeve 6. To remove wire 4, the hook end of wire 4 at end 12 of sleeve 6 is "unhooked", the hook at end 10 is removed, and wire 4 is merely pulled out of sleeve 6 at end 10.

Refer now to FIG. 5 which shows an optical fiber 30 being inserted by a technician 20 into end 10 of sleeve 6. Fiber 30 ultimately exits from end 12 of sleeve 6 and is secured in place by tape 18. Fiber 30 is rolled out from a roll of fiber 32. The fiber in roll 32 is thereafter wound onto bobbin 8.

Although the invention has been explained by reference to the foregoing embodiments, it should be understood that the invention can be implemented in many forms without departing from the scope or spirit of the invention. For example, although a wire has been described as being inserted into the sleeve, any rigid but flexible filament will work equally as well within the spirit of the invention. Also, even though excellent results have been achieved using a wire having a diameter larger than the diameter of the optical fiber (210–250 mm), satisfactory results may be obtainable through the use of other rigid yet flexible filaments when compared to using no filament at all. Thus the invention should be limited only in accordance with the appended claims.

We claim:

1. A fiber optic winding system comprising:
    a bobbin;
    a sleeve mounted on said bobbin for receiving an optical fiber; and
    a flexible and rigid filament, said filament extending through the entire length of said sleeve and being removable from said sleeve.

2. A method of winding optical fiber including the steps of:
    (a) providing a sleeve, said sleeve adapted for receiving an optical fiber;
    (b) inserting a flexible and rigid filament through the entire length of said sleeve;
    (c) mounting said sleeve and filament on a bobbin; and
    (d) removing said filament from said sleeve.

3. The method of claim 2 further including the steps of:
    (e) inserting an optical fiber through said sleeve; and
    (f) winding optical fiber onto said bobbin.

* * * * *